UNITED STATES PATENT OFFICE.

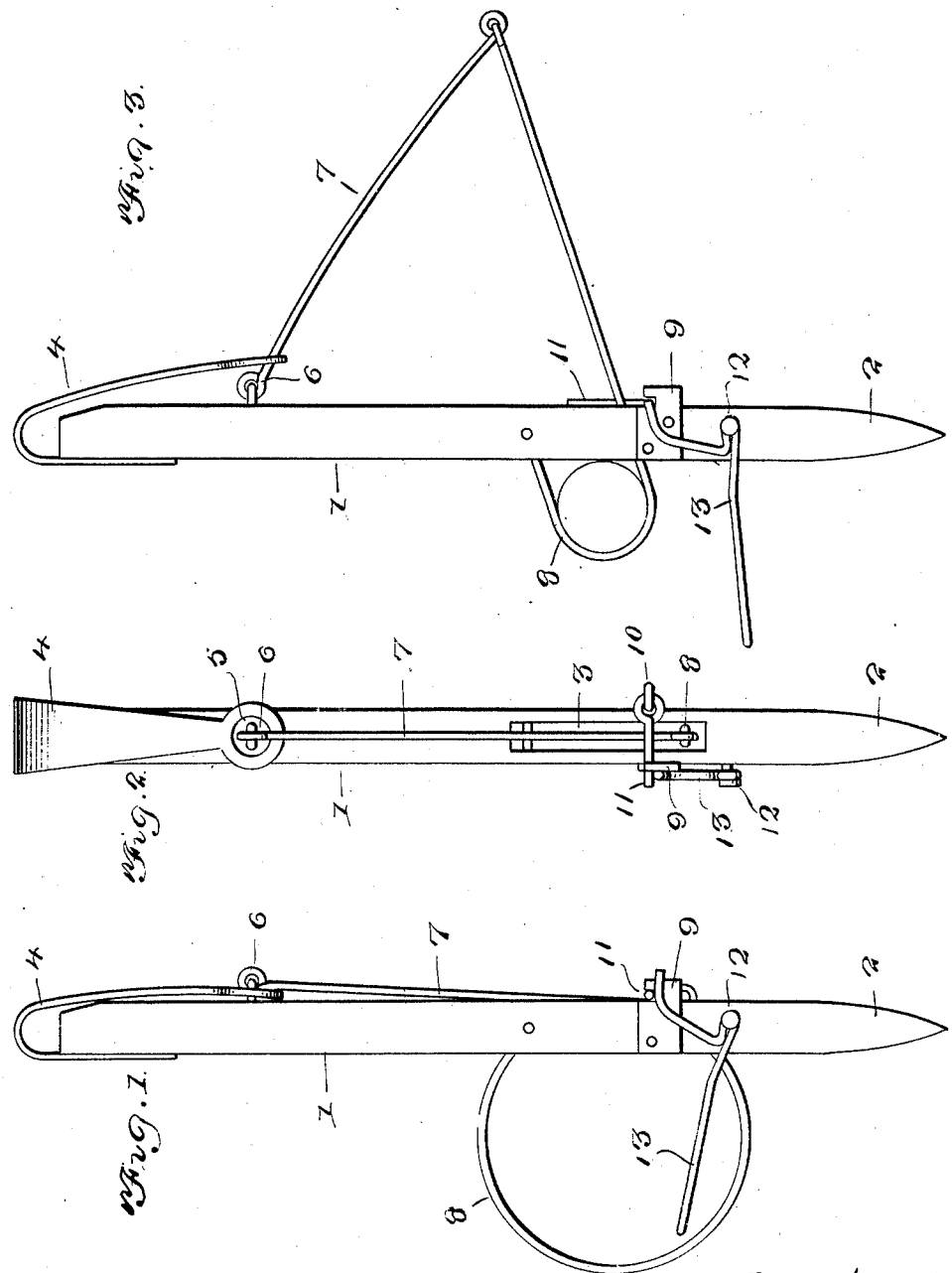

WILSON ALLEN SCOTT, OF MURRAY, NEBRASKA.

ANIMAL-TRAP.

1,372,561. Specification of Letters Patent. Patented Mar. 22, 1921.

Application filed April 10, 1920. Serial No. 372,829.

*To all whom it may concern:*

Be it known that I, WILSON ALLEN SCOTT, a citizen of the United States, residing at Murray, in the county of Cass and State of Nebraska, have invented new and useful Improvements in Animal-Traps, of which the following is a specification.

The object of my present invention is the provision of a simple, easily set and reliable animal trap of the choker type.

To the attainment of the foregoing, the invention consists in the improvement as hereinafter described and definitely claimed.

In the accompanying drawings, hereby made a part hereof:

Figure 1 is a side elevation illustrating my novel trap as positioned in and extending above the ground and as set ready to catch an animal.

Fig. 2 is an elevation taken at right angles to Fig. 1.

Fig. 3 is a side elevation showing the trap as sprung and as holding an animal.

Similar numerals of reference designate corresponding parts in all of the views of the drawings.

My novel trap may be constructed partly of wood and partly of metal or entirely of metal, in the discretion of the manufacturer. Among other elements it comprises a body bar 1. The said body bar 1 is preferably in the form of a stake, pointed at its lower end, as indicated by 2, and therefore adapted to be driven in and to extend upwardly from the ground. In the said body bar 1 is formed a slot 3.

Connected to the upper end of the body bar 1 is a spring 4 having an aperture 5, and pivotally connected at 6 to the body bar and extending through the aperture of the spring is an arm 7.

At 8 is a cable that is connected at one end to the body bar 1 in the slot 3 thereof and is connected at its opposite end to the arm 7.

Carried by the body bar 1 is a keeper 9, and loosely connected at 10 to the body bar is a latch 11 that is adapted to extend across the front of the slot 3 and be removably arranged in the keeper 9 and in front of the arm 7 to hold the said arm against forward and upward movement under the action of the spring 4.

Pivoted at 12 to the side of the body bar 1 is a trigger 13 including a long arm and a short arm; the short arm being adapted to rest under the latch 11 when the trap is set, and the long arm being adapted to rest immediately under or adjacent to the loop that is formed of the cable 8, and which loop, when the trap is set, extends rearwardly from the body bar 1.

Manifestly when an animal steps into the loop of the cable and depresses the long arm of the trigger 13, the latch 11 will be unseated and will release the arm 7, whereupon the sudden upward movement of the said arm 7 under the action of the spring 4, will be attended by the contraction of the loop and the catching and killing of the animal. In this connection it also will be understood that the trap is designed to be set in runways, holes and the like.

As will be appreciated from the foregoing, my novel trap is susceptible of being quickly and easily set, is reliable in operation, is simple and inexpensive in construction, and is well adapted to withstand the rough usage to which animal traps are ordinarily subjected.

Having described my invention, what I claim and desire to secure by Letters-Patent, is:

1. An animal trap comprising a body bar having a slot and equipped at one side of the slot with a keeper, an apertured spring carried at the upper part of the body bar, an arm hingedly connected to the body bar and extending through the aperture of the spring, a latch loosely connected to the body bar and adapted to be arranged in front of the arm and seated in the keeper, a cable connected to the body bar and the arm and extending through the slot in the bar and adapted to be formed in a loop projecting from the bar, and a trigger carried by the body bar and arranged when moved to unseat the latch.

2. An animal trap comprising a body, a keeper thereon, an arm hingedly connected to the body, a latch carried by the body and adapted to be seated in the keeper in front of said arm, a spring on the body to forcibly swing the arm away from the body, a cable connected to the body and the arm and adapted to be formed into a loop for squeezing an animal against the body, and a trigger carried by the body and adapted when actuated to displace the latch.

In testimony whereof I affix my signature.

WILSON ALLEN SCOTT.